United States Patent [19]

Walgenbach et al.

[11] 3,968,771

[45] July 13, 1976

[54] PROCESS AND APPARATUS FOR APPLYING PESTICIDES TO GRANULAR MATERIALS

[75] Inventors: David D. Walgenbach, Brookings, S. Dak.; Kenneth E. Stocker, Indianola, Iowa

[73] Assignee: Chevron Research Company, San Francisco, Calif.

[22] Filed: May 23, 1974

[21] Appl. No.: 472,784

[52] U.S. Cl. ............................. 118/303; 198/213
[51] Int. Cl.² .......................................... B05C 5/02
[58] Field of Search ...................... 118/303; 198/213

[56] References Cited
UNITED STATES PATENTS

| | | | |
|---|---|---|---|
| 2,845,167 | 7/1958 | Heiken | 198/213 |
| 2,988,203 | 6/1961 | Peterson | 198/213 |
| 3,236,173 | 2/1966 | Wohleb | 198/213 |
| 3,451,531 | 6/1969 | Barnes | 198/213 |
| 3,734,777 | 5/1973 | Bratschitsch | 118/303 X |
| 3,841,263 | 10/1974 | Rohloff | 118/303 |

*Primary Examiner*—Nile C. Byers
*Attorney, Agent, or Firm*—George F. Magdeburger; John Stoner, Jr.; Raymond Owyang

[57] ABSTRACT

A process for applying a pesticidal composition to granular vegetative products such as grains and seeds, which comprises:

1. loading and compacting a granular material into a first chamber by conveying it upwardly against the force of gravity;

2. conveying and tumbling the compacted granular material from the first chamber into a second chamber of greater capacity than the first chamber to permit mixing and tumbling of the granular material;

3. spraying the tumbling granular material with a pesticidal composition in the second chamber; and 4. discharging the sprayed granular material from the second chamber.

Apparatus suitable for carrying out the process of the invention are also described.

7 Claims, 4 Drawing Figures

U.S. Patent July 13, 1976 Sheet 1 of 2 3,968,771
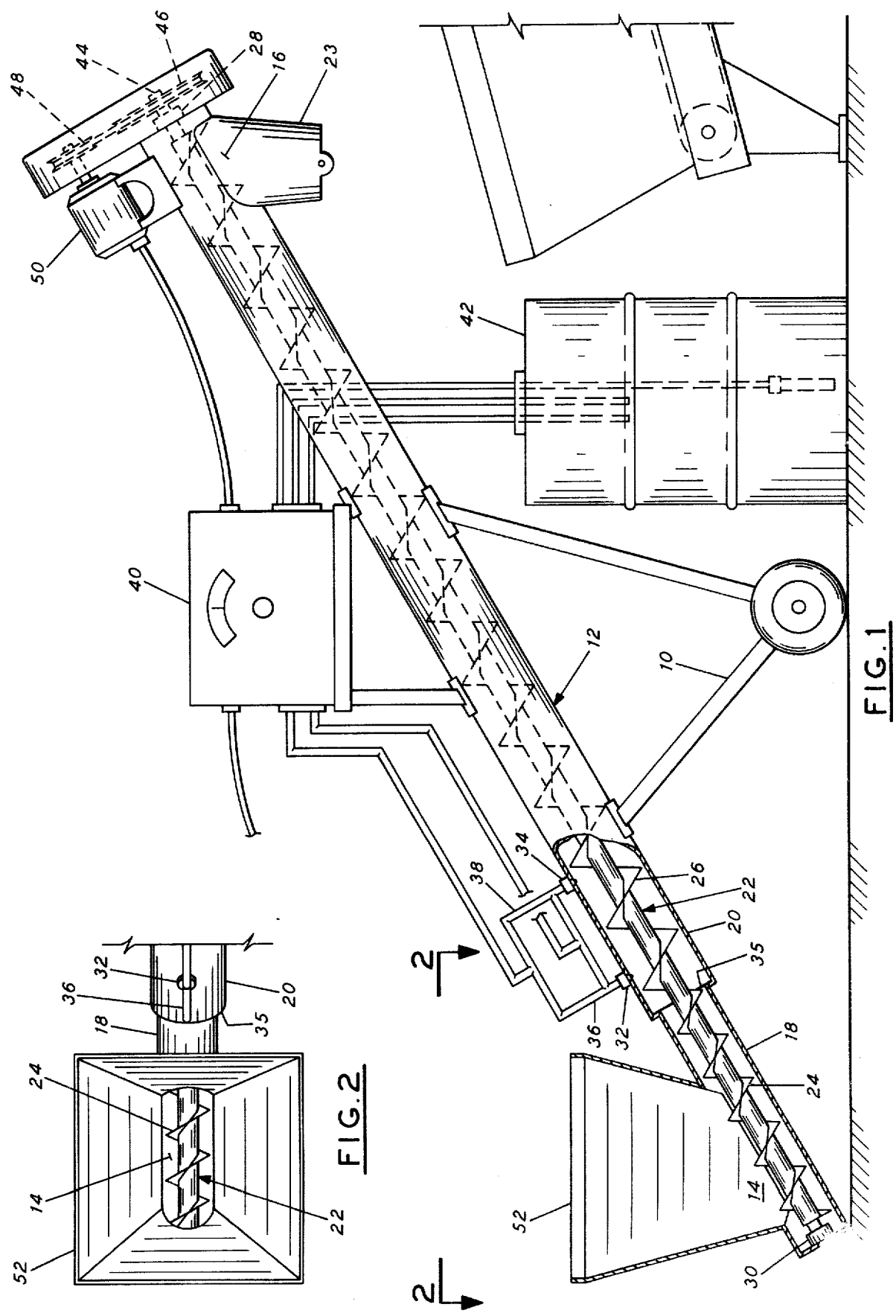

PROCESS AND APPARATUS FOR APPLYING PESTICIDES TO GRANULAR MATERIALS

DESCRIPTION OF THE INVENTION

Vegetative products such as grains and seeds are coated with pesticides to prevent pest attack, e.g., insects, fungi, bacteria, etc., during storage and use. The process and apparatus of the present invention apply a pesticidal composition to granular vegetative products in a rapid, efficient and continuous manner in such a way as to prevent the operator from coming into contact with the pesticidal composition.

According to the invention, a granular material is conveyed and compacted into a first chamber. The granular material is then conveyed and tumbled into a second chamber having a greater capacity than the first chamber, to permit expansion and tumbling of the granular material. In the second chamber the tumbling granular material is sprayed with a pesticidal composition, and then tumbled as it progresses along the second chamber. The length of the second chamber and the period of residence of the sprayed material is such that, as it is tumbled, the granular material is thoroughly coated with the pesticidal composition.

BRIEF DESCRIPTION OF THE DRAWINGS

For a better understanding of the invention, reference is made to the accompanying drawings, in which:

FIG. 1 is a view in side elevation of an apparatus according to the invention.

FIG. 2 is, on an enlarged scale, a plan view of a portion of the apparatus shown in FIG. 1.

FURTHER DESCRIPTION OF THE DRAWINGS AND EXAMPLES

Figure 4:
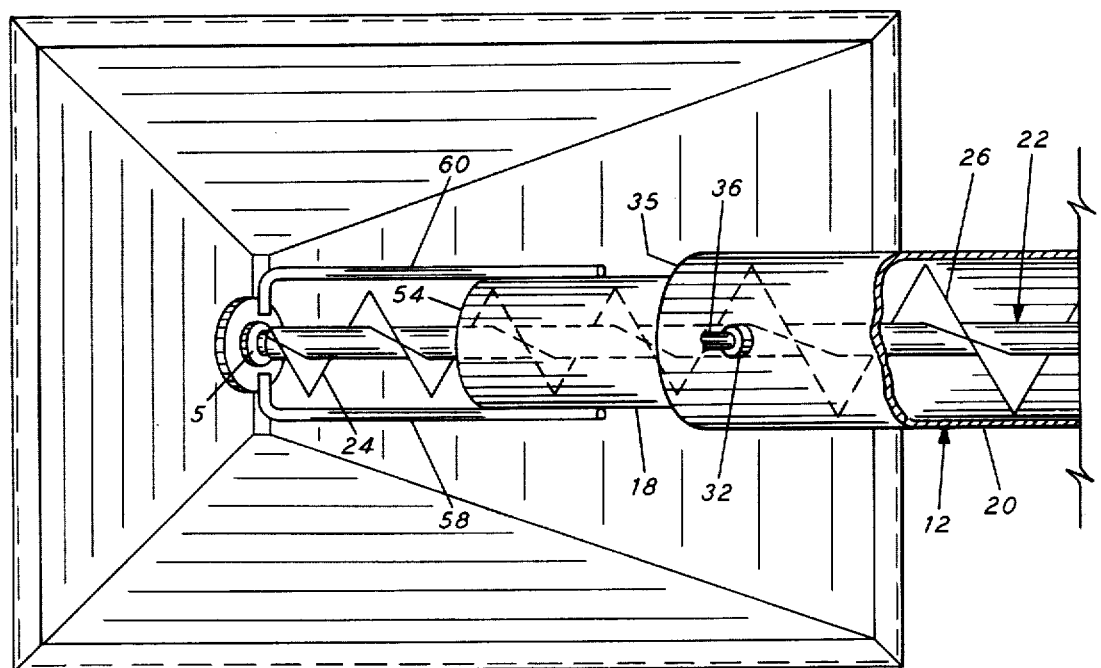
FIG. 4 is a plan view of the portion of the apparatus shown in FIG. 3.

The apparatus shown in FIGS. 1 and 2 comprises stand 10 which supports hollow cylindrical tube 12 at an angle to the horizontal. Tube 12 is closed at both ends, and has first opening 14 in the upper surface of the cylindrical wall adjacent the bottom portion of the tube and second opening 16 in the lower surface of the cylindrical wall adjacent the top portion of the tube. Tube 12 has portion 18 of reduced internal diameter at the lower length thereof and is formed with portion 20 of an enlarged internal diameter adjacent said portion of reduced internal diameter for the remaining length thereof.

In tube 12 is housed operably mounted auger 22, having an axis of rotation which coincides with the axis of the cylindrical tube. Auger 22 has portion 24 of reduced outside diameter complementary to the reduced internal diameter portion of the tube and portion 26 of enlarged outside diameter complementary to the enlarged internal diameter portion of the tube. The top end of auger 22 is supported by bearing 28 seated on the top-end closure of the cylindrical tube and the bottom end of auger 22 is supported by bearing 30 seated on the bottom-end closure of the cylindrical tube.

Spray nozzle assemblies 32 and 34 are mounted to spray inwardly at axially spaced-apart locations along the upper cylindrical wall of the enlarged-diameter portion of the tube adjacent the reduced-diameter portion of the tube. Thus spray nozzle assembly 32 is located in the enlarged-diameter portion of tube 12 closely adjacent annular wall 35 which separates the reduced-diameter portion of the tube, and spray nozzle assembly 34 is spaced apart from nozzle 32 along the path of travel of the granular material as it progresses along enlarged-diameter portion 20 of the tube.

Each of spray nozzle assemblies 32 and 34 is connected by means of conduits 36 and 38 to pump 40 by means of which a liquid pesticide composition can be metered and pumped out of reservoir 42.

The top end of auger 22, which is supported by bearing 28, extends through said bearing by means of shaft 44, on which pulley 46 is mounted. Pulley 46 is in driving connection by means of a V-belt with pulley 48 on the shaft of motor 50.

Hopper 52, which communicates with first opening 14, is mounted on the lower length of the tube. A grated intake guard (not shown) may be mounted above first opening 14 of the tube. Discharge spout 22 is mounted to second opening 16.

Figure 3:
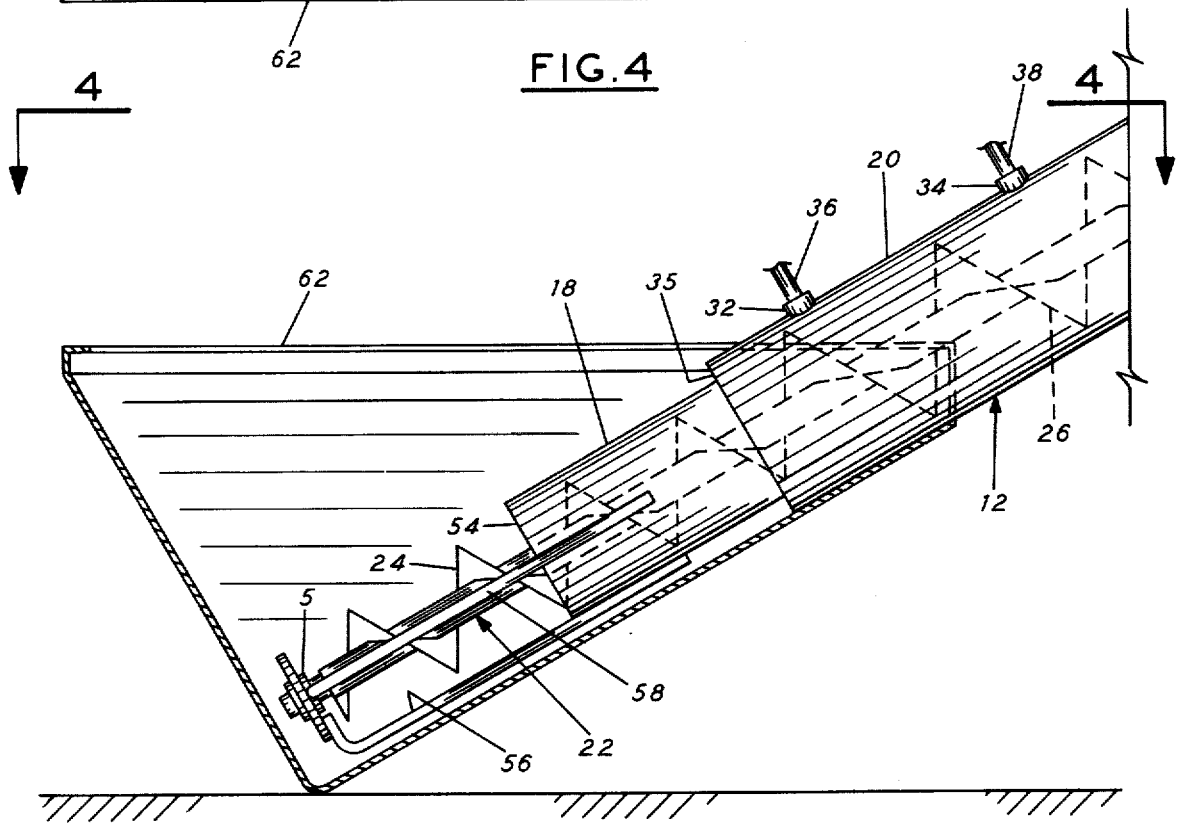
FIG. 3 is a view in side elevation of a modification of a portion of the apparatus shown in FIG. 1.

FIGS. 3 and 4 show a modification of an apparatus according to the invention wherein the tube has first opening 54 at the lower end of the tube and the lower end of the auger extends through first opening 54 and is supported by bearing 5 located on extension shafts 56, 58 and 60, which are mounted to the tube. Hopper 62, communicating with the first opening, additionally serves as the housing for the lower end of the auger.

The apparatus described in FIGS. 1 and 2 or 3 and 4 operates as follows: a granular material such as grain or seeds is fed into hopper 52 or 62. The granular material is then conveyed and compacted into the reduced-diameter portion 18 of the tube. From the reduced-diameter portion of the tube, the granular material is conveyed and tumbled into the enlarged-diameter portion 20 of the tube. During passage through the enlarged-diameter portion of the tube, the tumbling granular material is sprayed with a liquid pesticidal composition, e.g., propionic acid. The auger runs at constant speed.

In the apparatus according to the invention, the tube and the rotating auger are constructed and arranged to function as means to meter automatically the quantity of granular material being fed continuously into the enlarged-diameter portion of the tube and to limit this quantity to an amount which will be packed very loosely in the enlarged-diameter portion to permit the granular material to tumble and expose all surfaces to the pesticidal composition. Therefore, it is desireable that the reduced-diameter portion of the tube be mounted at an angle to the horizontal so that the granular material will be compacted to essentially completely fill the reduced-diameter portion of the tube as it is being conveyed. Similarly, it is desirable that the capacity of the enlarged-diameter portion of the tube be sufficiently greater than the reduced-diameter portion of the tube to permit the granular material being metered into the enlarged-diameter portion to be packed loosely in a tumbleable condition.

To illustrate the advantages of the apparatus according to the invention, the following experiments were performed. Moist corn grain was treated with propionic acid or methylene bis-propionate in an apparatus having a auger with a 4 inch diameter at the bottom length (1 foot 6 inches long) and a 6 inch diameter at the upper length (8 feet 6 inches long). Two inwardly directed by-pass spray nozzles having a conical spray pattern were mounted in tandem in the upper surface of the cylindrical wall of the enlarged-diameter length of tube adjacent the annular wall which separates the reduced-diameter length of the tube. The auger was supported at a 45° angle. the propionic acid or methylene bispropionate was employed at a concentration of 6 ounces per bushel. The treated grain was stored in a 1-gallon container at 75°F (24°C) and in a 55-gallon container at ambient temperatures under field conditions. The length of mold and fungal growth control was then determined. For comparison, corn grain was also treated with the same fungicides in another apparatus having a 6 inch constant diameter auger and then stored under the same conditions. The results are tabulated below.

| Corn Moisture Content | Treatment | Auger | Duration of Control (weeks) | |
|---|---|---|---|---|
| | | | 1 gal. | 55 gal. |
| 34% | Propionic acid | 4" to 6" | 4 | 9 |
| 34% | Propionic acid | 6" | 2 | 4 |
| 34% | Methylene bispropionate | 4" to 6" | 6 | 9 |
| 34% | Methylene bispropionate | 6" | 4 | 4 |
| 33% | Propionic acid | 4" to 6" | 4 | 6 |
| 33% | Propionic acid | 6" | 2 | 4 |
| 33% | Methylene bispropionate | 4" to 6" | 4 | 6 |
| 33% | Methylene bispropionate | 6" | 2 | 4 |

The results show that increased mold and fungal control was obtained with the apparatus having a 4 inch diameter bottom length and a 6 inch diameter top length. Similar improved distribution of pesticidal compositions was obtained with apparatus having 6 to 8 inch and 10 to 12 inch auger diameters.

What is claimed is:

1. An apparatus for applying a liquid composition to a granular material which comprises:
    a hollow cylindrical tube, said tube having a portion of reduced internal diameter at the low length thereof and being formed with an enlarged internal diameter adjoining said portion of reduced internal diameter at the lower length thereof and being formed with an enlarged internal diameter adjoining said portion of reduced internal diameter for the remaining length thereof;
    a first opening in the bottom portion of said reduced-diameter portion of said tube for loading a granular material into said tube;
    a second opening in the top portion of said enlarged-diameter of said tube for discharging said granular material;
    a rotatable auger housed in said tube and operably mounted for conveying said granular material through said tube;
    means for supporting said tube at an angle to the horizontal to essentially completely fill said granular material in said reduced-diameter portion of said tube;
    at least one inwardly directed liquid spray nozzle assembly mounted on said enlarged-diameter portion and positioned adjacent said reduced-diameter portion;
    a liquid supply system connected to said spray nozzle assembly; and
    means for rotating said auger, said rotating auger and said tube being constructed and arranged to automatically meter the quantity of said granular material being conveyed from the reduced-diameter portion to the enlarged-diameter portion and to limit said quantity to an amount which will be packed loosely in said enlarged-diameter portion to permit said granular material to tumble and expose all surfaces to said composition.

2. The apparatus of claim 1 wherein two or more spray nozzle assemblies are positioned at axially spaced-apart locations along the upper cylindrical wall of said enlarged-diameter portion of said tube.

3. The apparatus of claim 2 wherein said first opening is at the end of said tube and the lower end of said auger extends through said first opening.

4. The apparatus of claim 3 wherein a hopper is mounted on said tube for feeding of said granular material into said first opening and as a housing for said lower end of said auger.

5. The apparatus of claim 2 wherein said first opening is in the upper surface of the cylindrical wall of said reduced-diameter portion of said tube and the length of said reduced-diameter portion of said tube is greater than that of said first opening.

6. The apparatus of claim 2 wherein said second opening is in the lower surface of the cylindrical wall adjacent the top portion of said enlarged-diameter portion of said tube and a discharge spout is mounted to said second opening.

7. An apparatus for applying a liquid composition to a granular material which comprises:
    a hollow cylindrical tube, said tube having a portion of reduced internal diameter at the lower length thereof and being formed with an enlarged internal diameter adjoining said portion of reduced internal diameter for the remaining length thereof;
    a first opening at the end of said tube for loading a granular material into said tube;
    a second opening in the lower surface of the cylindrical wall adjacent the top portion of said tube for discharging said granular material from said tube;
    a rotatable auger housed in said tube and operably mounted for conveying said granular material through said tube, the lower end of said auger extending through said first opening to facilitate the feeding of said granular material into said tube;
    a hopper mounted on said tube for feeding said granular material into said first opening and as a housing for said lower end of said auger;
    means for supporting said tube at an angle to the horizontal to compact and fill said granular material in said reduced-diameter portion of said tube;
    two or more inwardly directed liquid spray nozzle assemblies mounted adjacent said reduced-diameter portion of said tube and at axially spaced locations along the upper cylindrical wall of said enlarged-diameter portion of said tube;
    a liquid supply system connected to said spray nozzle assemblies; and
    means for rotating said auger, said rotating auger and tube being adapted to meter the quantity of said granular material being conveyed from the reduced-diameter portion to the enlarged-diameter portion and to limit said quantity to an amount which will be packed loosely in said enlarged-diameter portion to permit said granular material to tumble and expose all surfaces to said composition.

* * * * *